United States Patent [19]

Yamano

[11] Patent Number: 4,931,822
[45] Date of Patent: Jun. 5, 1990

[54] FOCUS DETECTING APPARATUS
[75] Inventor: Shozo Yamano, Tokyo, Japan
[73] Assignee: Nikon Corporation, Tokyo, Japan
[21] Appl. No.: 424,177
[22] Filed: Oct. 19, 1989
[30] Foreign Application Priority Data Oct. 24, 1988 [JP] Japan ................................. 63-267621

[51] Int. Cl.⁵ ............................................. G03B 3/00
[52] U.S. Cl. ..................................... 354/402; 354/476
[58] Field of Search ....................... 354/402, 404–408, 354/429, 432, 476

[56] References Cited
U.S. PATENT DOCUMENTS
4,660,955  4/1987  Ishida et al. ....................... 354/408

Primary Examiner—L. T. Hix
Assistant Examiner—David M. Gray
Attorney, Agent, or Firm—Shapiro and Shapiro

[57] ABSTRACT

A focus detecting apparatus in a camera comprises quantity-of-light detecting means producing an output in conformity with the intensity of an incident light from an object to be photographed, a charge accumulation type light receiving device having a plurality of light receiving elements, each of the light receiving elements receiving the light from the object to be photographed and accumulating therein charges conforming to the light, the light receiving device outputting a plurality of accumulation signals conforming to the plurality of light receiving elements, and calculating means for effecting the focus detection of a photo-taking lens on the basis of the plurality of accumulation signals of the light receiving device. The calculating means controls the charge accumulation time of the light receiving device in conformity with the output from the quantity-of-light detecting means when the focus detecting apparatus effects the first focus detection after the starting thereof, and controls the Nth charge accumulation time of the light receiving device on the basis of the plurality of accumulation signals obtained by the N−1th focus detection when the focus detecting apparatus effects the Nth (N≧2) focus detection after the starting thereof.

8 Claims, 5 Drawing Sheets

FOCUS DETECTING APPARATUS

BACKGROUND OF THE INVENTION

1. Field of the Invention

This invention relates to a focus detecting apparatus in an auto focus camera.

2. Related Background Art

A charge accumulation type light receiving element, for example, a CCD image sensor, is used in a focus detecting apparatus in a camera. Where such a kind of sensor is used, the illumination of the element surface varies from a high luminance to a low luminance depending on an object to be photographed and therefore, the accumulation time is varied and controlled so that the signal level to be processed becomes substantially constant. There have been the following methods of controlling the accumulation time. One of them is a method as disclosed, for example, in U.S. Pat. No. 4,660,955 wherein the luminance of an object is monitored by a light receiving device differing from an image sensor and accumulation is terminated when the monitoring output reaches a predetermined level. Besides this method, there is also a method wherein charges are accumulated in advance in an image sensor for a certain time and after the termination of the accumulation, a signal from the image sensor itself is introduced and the next accumulation time is determined in conformity with the signal level.

The prior arts as described above have suffered from the following problems. In the former, the image sensor is a CCD or the like and therefore, it is difficult to individually detect a monitoring output corresponding to each light receiving element of the image sensor. As a result, it is unavoidable to monitor the average value of received light in a certain degree of range. If so, when as shown, for example, in FIG. 8 of the accompanying drawings, there is an object of high luminance in the fashion of a spot, if monitoring is effected at the average value, there has been the problem that the peak value exceeds the dynamic range of signal processing and accurate focus detection calculation is impossible. Also, in the latter method, accurate focus detection calculation is possible, but such an accumulation time that the sensor output assumes a proper level is obtained from the last accumulation time and the signal level thereof and therefore, there is no accumulation time data in the first accumulation time after the closing of the power source switch, and this has led to the disadvantage that if accumulation is effected with the initial value set in a certain accumulation time, several accumulations must be effected until the sensor output becomes proper and thus, much time is required for convergence.

SUMMARY OF THE INVENTION

It is an object of the present invention to provide a focus detecting apparatus which accomplishes accurate focus detection.

It is a further object of the present invention to provide a focus detecting apparatus of which the focus detection accuracy is not affected by the detected luminance distribution of an object to be photographed and in which the time required from after the power source switch is closed until a focus detection result of predetermined accuracy is obtained is very short.

The focus detecting apparatus according to the present invention is provided with means for detecting the quantity of light and a time counter for measuring the accumulation time. The first accumulation time after the closing of the power source switch (including a case where focus detection is discontinued and then resumed) may be controlled by said means for detecting the quantity of light, and the second and subsequent accumulation times may be controlled on the basis of a result obtained by calculating the last output level of a focus detecting sensor and the accumulation time thereof.

Accordingly, in the first accumulation after the closing of the power source switch, the output level of the sensor becomes a substantially proper level, and in the second accumulation, it becomes a more proper level and thus, the response after the closing of the power source switch is quick and accurate focus detection becomes possible.

DESCRIPTION OF THE PREFERRED EMBODIMENTS

Figure 1:
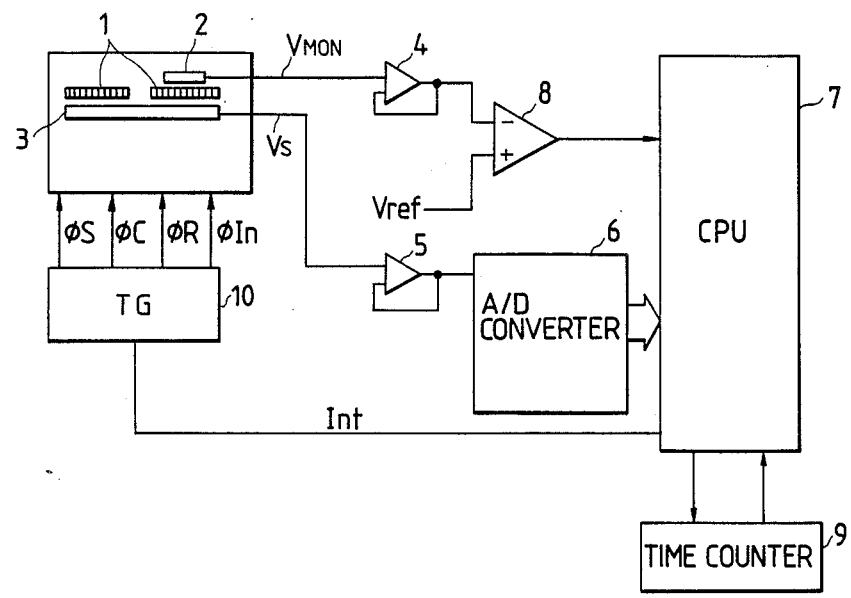
FIG. 1 schematically shows the construction of a first embodiment.
Figure 2:
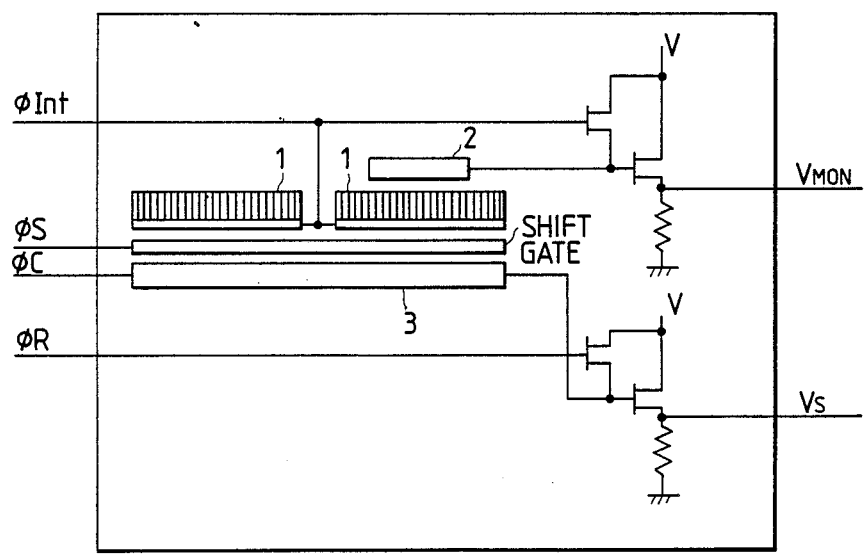
FIG. 2 the shows partial construction of the first embodiment.

FIG. 1 shows an embodiment of the present invention. An object image is projected onto a charge accumulation type light receiving unit (CCD) 1 having a pair of one-dimensional image sensors by an imaging optical system not shown. A photodiode 2 putting out as a monitor output an output corresponding to the amount of exposure of the light receiving unit 1 is provided closely adjacent to the light receiving unit 1, and that output is input from a terminal Vmon to a buffer 4. An analog shift register 3 is disposed in contact with the light receiving unit 1. The outputs of the light receiving element of the light receiving unit 1 are successively put out as a time-serial signal from the terminal Vs of the analog shift register 3 after the termination of accumulation, and are input to an A/D converter 6 through a buffer 5. The outputs of the light receiving elements of the light receiving unit 1 converted into digital values by the A/D converter 6 are successively introduced into a CPU 7. The output of the buffer 4 is input to one input of a comparator 8. The other input of this comparator 8 is connected to a predetermined potential Vref, and the output of the comparator 8 is introduced into the CPU 7. The CPU 7 is connected also to a time counter 9, and is capable of clearing, starting and reading of the counted value of the time counter 9. Also, the CPU 7 is connected to a timing generator (TG) 10 so as to be able to deliver the accumulation starting and terminating signal (INT) of the light receiving unit 1 to the timing generator (TG) 10. The timing generator (TG) 10 outputs a signal $\phi$INT regarding the accumulation, a signal φR regarding the reading-out, a transportation clock φC and a shift pulse φS so that the light receiving unit 1 can start and terminate the accumulation under the control of the CPU 7 and after the termination of the accumulation, the reading-out can be sequentially effected in the order of the shift of the accumulated charges to the shift register 3 and the transportation of the signal charge in the shift register 3. The detailed constructions of the output portions of the light receiving unit 1, the photodiode 2 and the shift register 3 are as shown in FIG. 2.

Figure 3:
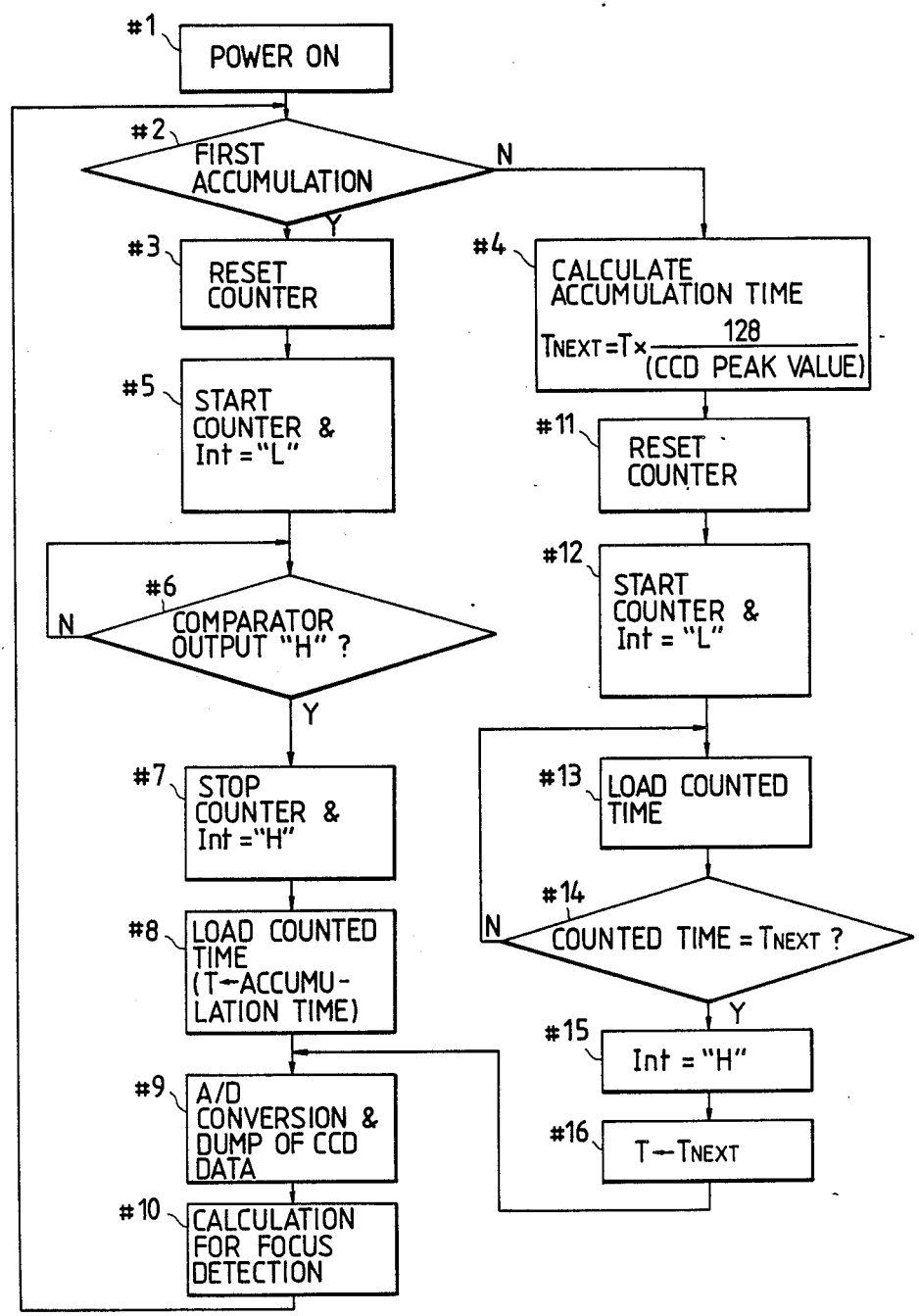
FIG. 3 is a flow chart illustrating the operation of the first embodiment.
Figure 4:
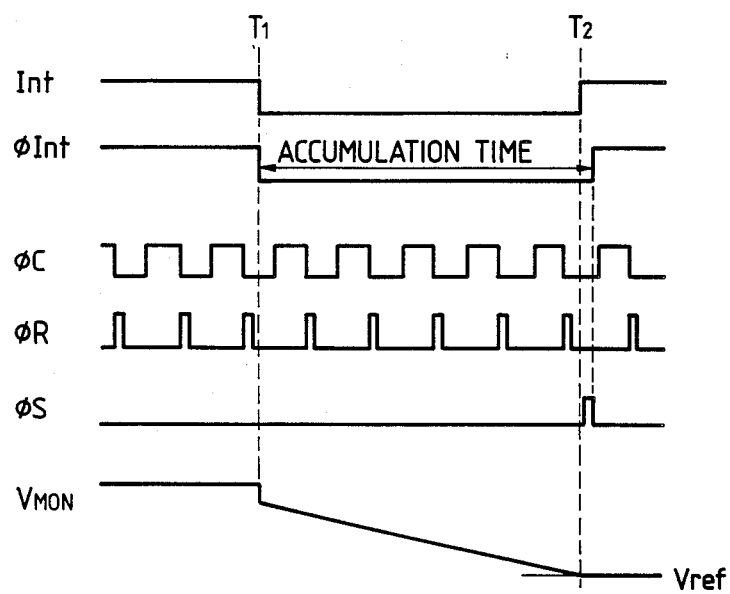
FIG. 4 is a timing chart illustrating the operation of the first embodiment.
Figure 8:
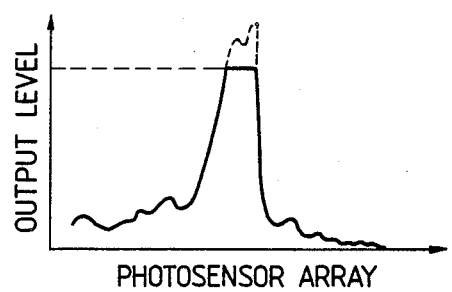
FIG. 8 is a graph for illustrating disadvantages peculiar to the prior art.

Operation of the thus constructed embodiment will hereinafter be described. FIG. 3 shows the operation flow of the CPU, and description will be made in accordance therewith. After the closing of the power source switch (step #1), the CPU 7 first judges whether the accumulate in the light receiving unit 1 for focus detection is the first accumulation after the closing of the power source switch (step #2), and if it is the first accumulation advance is made to step #3, and if it is not the first accumulation, skip is made to step #4. At the step #3, the time counter 9 is reset, and next, at step #5, the time counter 9 is started and the accumulation signal INT is set to "L", and the timing generator 10 is instructed to start the accumulation. At step #6, it is detected that the output of the comparator 8 becomes "H". As soon as the accumulation signal INT from the CPU 7 becomes "L", as shown in FIG. 4, the timing generator 10 reports it to the light receiving unit 1, whereby the accumulating operation of the light receiving unit 1 is started. At the same time, the resetting of the monitoring photodiode is released, and as shown in FIG. 4, an output corresponding to the quantity of light impinging on the monitoring photodiode (in this example, the exposure amount from the start of the accumulation) is produced from the terminal Vmon. The output of the comparator 8 is designed to put out "L" until the exposure amount of the monitoring photodiode reaches a predetermined value, and to put out "H" when said exposure amount reaches said predetermined value. Turning back to the flow of CPU, at step #6, it is detected that the output of the comparator 8 becomes "H" and therefore, when the exposure amount of the monitoring photodiode reaches said predetermined value and the output of the comparator 8 becomes "H", advance is immediately made to step #7, where the counting by the time counter 9 is stopped and the accumulation signal INT is set to "H". At step #8, the time counter value is read and this is stored as the accumulation time in T. When the accumulation signal INT becomes "H", the timing generator, as shown in FIG. 4, shifts the accumulated charges to the analog shift register 3 and therefore, the shift pulse φS is given to the shift gate, thereby terminating the accumulation. The charges of the light receiving elements introduced into the analog shift register are successively output as light receiving element signals from the terminal Vs by the transportation clock φC. The light receiving element signals successively output from the terminal Vs by this transportation clock φC are A/D-converted at one light receiving element unit, and the CPU introduces thereinto these A/D-converted values in succession (step #9), and effects focus detection calculation by the use of this light receiving element data (step #10), and skip is again made to step #1. At the step #9, the maximum value Pmax of the outputs of the plurality of elements of the light receiving unit 1 is detected, and the details of this operation will be described later. In the second and subsequent accumulations, skip is made to step #4, where the next accumulation time is determined. That is, calculation is effected so that of the light receiving element signals A/D-converted at the last time, the maximum value becomes a predetermined next time. Here, the predetermined value, if in the case of 8-bit A/D conversion, is set to 128, and when the last accumulation time is T and the maximum light receiving element signal is the CCD peak value and the next accumulation time is Tnext, the next accumulation time is found by the following equation:

$$\text{Tnext} = T \times 128 \text{ (CCD peak value)}.$$

Subsequently, at step #11, the time counter is reset, whereafter the time counter 9 is started and the signal INT is set to "L", and the timing generator 10 is instructed to start the accumulation (step #12). Subsequently, at step #13, the time counter value is read out and whether the counted value is equal to Tnext is judged, and if it is equal to Tnext, advance is made to step #15. If the counted value is not equal to Tnext, skip is made to step #13, where the reading-in of the time counter value is repeated. At the step #15, the timing generator 10 is instructed to terminate the accumulation with the accumulation signal INT as an "H" output, and at step #16, Tnext is stored in the accumulation time T for the calculation of the next accumulation time, and skip is made to step #9, where the A/D-converted values of the CCD data are successively introduced and focus detection calculation is effected (step #10), and skip is again made to step #2, where this sequence is repeated.

Figure 5:
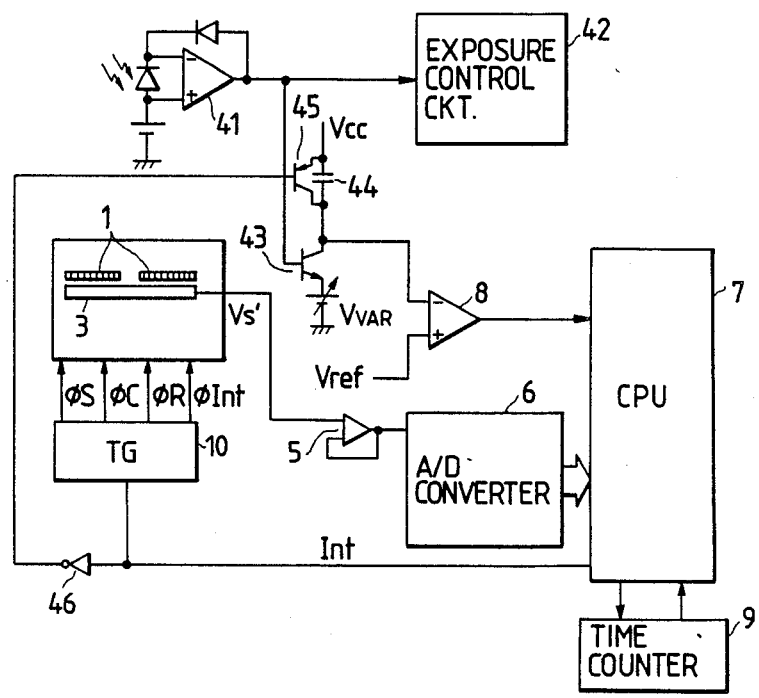
FIG. 5 schematically shows the construction of a second embodiment.

FIG. 5 shows the construction of a focus detecting apparatus according to another embodiment, and in FIG. 5, portions similar to those in FIG. 1 are given similar reference numerals. In this embodiment, a photometering circuit for controlling the exposure amount of film connected to a film exposure amount control circuit for determining the aperture value of a phototaking lens and the speed of a shutter during the exposure of the film is diverted to a quantity-of-light detecting circuit. The output of a photometering amplifier 41 is input to a film exposure amount control circuit 42 and is also input to the base of a transistor 43. The collector of the transistor 43 is connected to the negative input terminal of the comparator 8 and is also connected to the other end of a capacitor 44 having one end thereof connected to a potential Vcc. The emitter of the transistor 43 is set to such an adjustable potential Vvar that the CCD light receiving element signal level becomes suitable. The capacitor 44 is capable of being short-circuited by a transistor 45. During the non-accumulation, the accumulation signal output INT from the CPU 7 is "H" and therefore, the transistor 45 is turned on through an inverter 46 to short-circuit the capacitor. When the start of the accumulation is ordered from the CPU 7, the transistor 45 is turned off and the capacitor 44 is gradually charged in conformity with the output of the photometering amplifier 41. When as a result of this charging, the potential at the junction between the capacitor 44 and the transistor 43 reaches a predetermined value Vref, the output of the comparator 8 becomes "H". The operation flow of the CPU 7 is similar to that of FIG. 1 and therefore need not be described.

Figure 6:
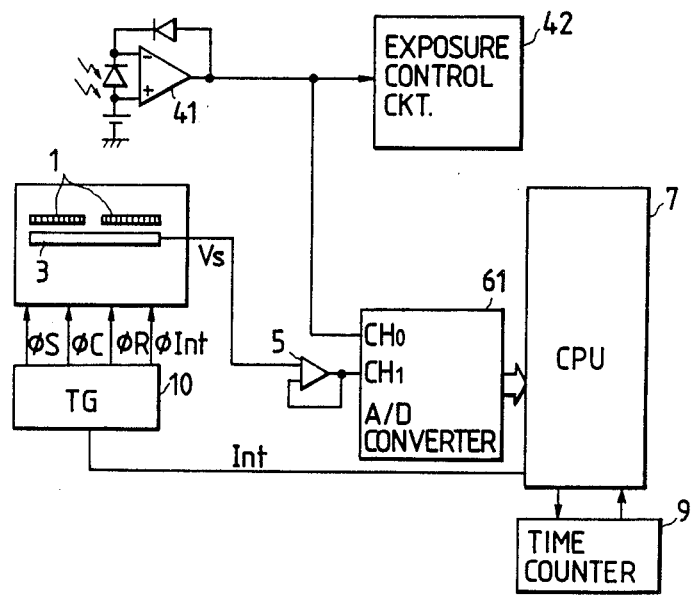
FIG. 6 schematically shows the construction of a third embodiment.

In a focus detecting apparatus according to still another embodiment, as shown in FIG. 6, the output of the photometering amplifier 41 is input to an A/D converter 61 to cause this A/D converter to process the output of the photometering amplifier. The first accumulation time after the closing of the power source switch is predetermined by the CPU 7 before the first accumulation on the basis of the A/D conversion value of the photometering amplifier 41. The second and subsequent accumulations, as in the previous embodiments, are found by calculation from the maximum value of the A/D-converted data and the accumulation time of the CCD at the last time. In the case of this embodiment, the comparator is unnecessary.

Figure 7:
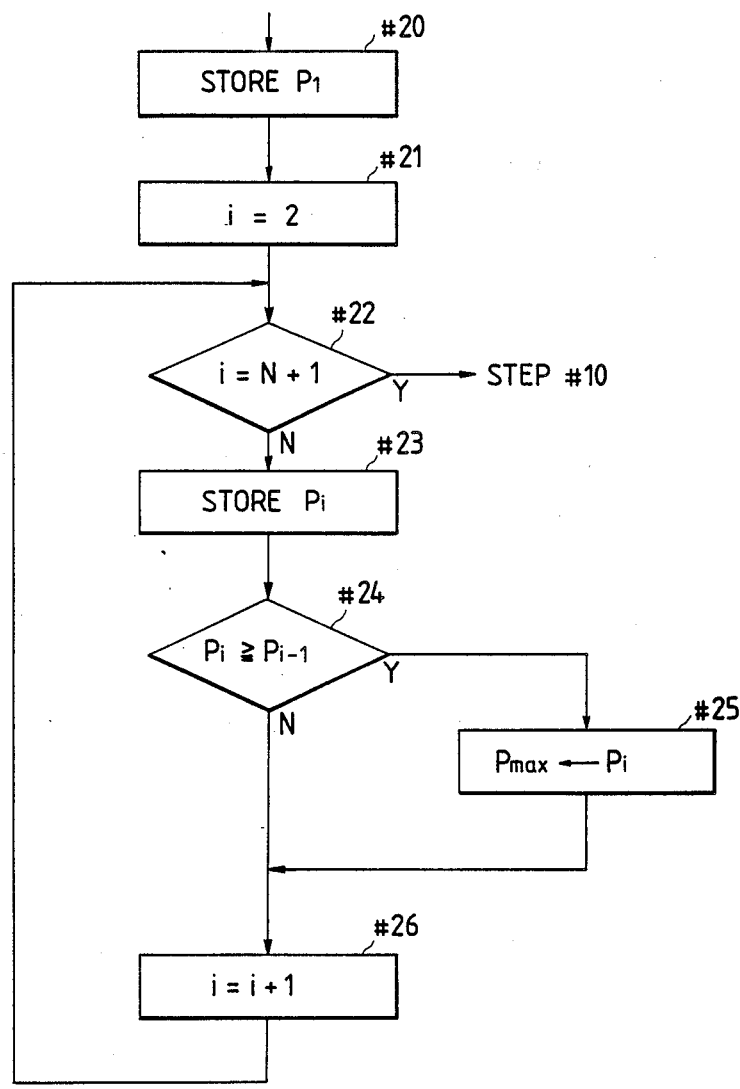
FIG. 7 is a flow chart showing a part of the operation of the present invention in detail.

The operation of detecting Pmax which is the peak value of the CCD at the step #9 of FIG. 3 is shown in the flow chart of FIG. 7.

At step #20, the CPU 7 stores the output $P_1$ of the first element of one of the pair of image sensors of the light receiving unit 1 into the internal memory thereof. The first element is shield from light so that no light may enter it. At step #21, the content i of the internal counter of the CPU 7 is set to 2. At step #22, whether the content of the internal counter is N+1 is judged. N corresponds to the number of the light receiving elements of one of the image sensors of the light receiving unit 1. At step #23, the output $P_i$ of the ith light receiving element is stored into the internal memory. At step #24, the output $P_i$ of the ith element is compared with the output $P_{i-1}$ of the i-1th element, and if the magnitude of $P_i$ is above the magnitude of $P_{i-1}$, the content of the internal memory $P_{max}$ is rewritten into $P_i$ at step #25. At step #26, the content of the internal counter is incremented by 1. If at the step #22, the content of the internal counter becomes N+1, shift is made to the step #10 of FIG. 7. Thereby, the peak value of the CCD is detected.

As described above, in the focus detecting apparatus according to the present invention, the first accumulation time after the closing of the power source switch is controlled in conformity with the output of the quantity-of-light detecting circuit and therefore, irrespective of high luminance or low luminance, a substantially proper light receiving element signal level is obtained from the first time. Further, at the second and subsequent times, the next accumulation time is determined by calculation from the light receiving element signal level and the accumulation time and therefore, even in the case of an object to be photographed which has a special luminance distribution, focus detection can be accomplished reliably and the response of focus detection from after the closing of the power source switch can be made quick.

I claim:

1. A focus detecting apparatus in a camera comprising:
   quantity-of-light detecting means producing an output in conformity with the intensity of an incident light from an object to be photographed;
   a charge accumulation type light receiving device having a plurality of light receiving elements, each of said light receiving elements receiving the light from the object to be photographed and accumulating therein charges conforming to said light, said light receiving device outputting a plurality of accumulation signals conforming to said plurality of light receiving elements; and
   calculating means for effecting the focus detection of a photo-taking lens on the basis of the plurality of accumulation signals of said light receiving device;
   said calculating means controlling the charge accumulation time of said light receiving device in conformity with the output from said quantity-of-light detecting means when said focus detecting apparatus effects the first focus detection after the starting thereof, and controlling the Nth charge accumulation time of said light receiving device on the basis of the plurality of accumulation signals obtained by the N−1th focus detection when said focus detecting apparatus effects the Nth (N≧2) focus detection after the starting thereof.

2. A focus detecting apparatus according to claim 1, further comprising a time counter for measuring the time of the charge accumulation effected by said light receiving device and wherein said calculating means calculates the Nth charge accumulation time from the N−1th charge accumulation time measured by said time counter so that the maximum value of said plurality of accumulation signals becomes a predetermined value when said focus detecting apparatus effects the Nth focus detection after the starting thereof.

3. A focus detecting apparatus according to claim 2, wherein said quantity-of-light detecting means is a monitoring circuit disposed near said light receiving device for effecting photoelectric conversion.

4. A focus detecting apparatus according to claim 3, wherein said monitoring circuit produces an output corresponding to the average intensity of the incident light to the whole or a part of said light receiving device with the start of the charge accumulation of said light receiving device.

5. A focus detecting apparatus according to claim 2, wherein said quantity-of-light detecting means is a photometering circuit for controlling the exposure amount of a film.

6. A focus detecting apparatus according to claim 2, which is a TTL phase detection system and wherein said light receiving device is a CCD image sensor which comprises a pair of groups of said light receiving devices arranged in a row.

7. A focus detecting apparatus according to claim 4, which is a TTL phase detection system and wherein said light receiving device is a CCD image sensor which comprises a pair of groups of said light receiving devices arranged in a row.

8. A focus detecting apparatus according to claim 7, wherein said monitoring circuit includes a photoelectric converting device formed on the same semiconductor substrate as said CCD image sensor, said photoelectric converting device having a light receiving area disposed parallel to said groups of light receiving devices.

* * * * *